(12) United States Patent
Werner

(10) Patent No.: US 8,329,763 B2
(45) Date of Patent: Dec. 11, 2012

(54) HYDROGEL

(75) Inventor: Siol Werner, Darmstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 1329 days.

(21) Appl. No.: 10/570,615

(22) PCT Filed: Sep. 20, 2004

(86) PCT No.: PCT/EP2004/010519
§ 371 (c)(1),
(2), (4) Date: Mar. 3, 2006

(87) PCT Pub. No.: WO2005/030820
PCT Pub. Date: Apr. 7, 2005

(65) Prior Publication Data
US 2006/0264571 A1    Nov. 23, 2006

(30) Foreign Application Priority Data
Sep. 25, 2003    (DE) .................................. 103 44 411

(51) Int. Cl.
| | |
|---|---|
| C09K 3/00 | (2006.01) |
| C08F 290/06 | (2006.01) |
| C08F 283/00 | (2006.01) |
| C08F 283/06 | (2006.01) |
| C08F 222/00 | (2006.01) |
| C08F 222/10 | (2006.01) |
| C08F 265/04 | (2006.01) |
| G02C 7/04 | (2006.01) |
| C08L 51/00 | (2006.01) |
| C08L 31/02 | (2006.01) |
| C08J 3/02 | (2006.01) |
| E04B 1/84 | (2006.01) |
| C25B 9/00 | (2006.01) |
| C02F 1/469 | (2006.01) |
| B32B 27/30 | (2006.01) |

(52) U.S. Cl. ........ 516/98; 526/321; 526/323.1; 523/106; 524/832; 524/916; 525/937; 204/606; 204/616; 252/62; 351/159.02

(58) Field of Classification Search .................... 516/98; 526/321, 323.1; 523/106; 351/159.02; 524/832, 524/916; 525/937; 204/414, 469, 606, 616; 181/208; 252/62
See application file for complete search history.

(56) References Cited

U.S. PATENT DOCUMENTS
3,607,848 A    9/1971    Stoy et al.
(Continued)

FOREIGN PATENT DOCUMENTS
DE    18 17 716    11/1970
(Continued)

OTHER PUBLICATIONS

O'Neil, Maryadele J. et al. (© 2006, 2010), The Merck Index—An Encyclopedia of Chemicals, Drugs, and Biologicals (14th Ed—Vers 14.6), Merck Sharp & Dohme Corp., Whitehouse Station, NJ (Knovel Date: Dec. 1, 2007), Entries Thioglycerol, Online @ http://knovel.com/web/portal/browse/display?_EXT_KNOVEL_DISPLAY_bookid=1863&VerticalID=0.*

(Continued)

Primary Examiner — Daniel S Metzmaier
(74) Attorney, Agent, or Firm — Oblon, Spivak, McClelland, Maier & Neustadt, L.L.P.

(57) ABSTRACT

The invention relates to hydrogels containing water and polyethylene glycol-dimethacrylates in a polymerized form. The polymethacrylate blocks are so short that they form no proper phase. The invention further relates to methods for producing said hydrogels. The inventive hydrogels are provided with reduced haze and are used as materials for contact lenses, electrophoresis gels, membrane materials, and sound-absorbing materials.

14 Claims, 1 Drawing Sheet

U.S. PATENT DOCUMENTS

| | | | |
|---|---|---|---|
| 3,681,269 A | | 8/1972 | Heitz et al. |
| 3,700,752 A | | 10/1972 | Hutchinson |
| 3,914,341 A | | 10/1975 | Kliment et al. |
| 4,684,558 A | | 8/1987 | Keusch et al. |
| 4,871,785 A | * | 10/1989 | Froix .................. 523/106 |
| 5,132,384 A | * | 7/1992 | Matsuda et al. ........ 526/321 |
| 5,135,297 A | * | 8/1992 | Valint, Jr. .............. 351/160 R |
| 5,147,394 A | | 9/1992 | Siepser et al. |
| 5,311,223 A | | 5/1994 | Vanderlaan |
| 5,397,449 A | | 3/1995 | Zewert et al. |
| 5,690,953 A | | 11/1997 | Molock et al. |
| 5,849,816 A | * | 12/1998 | Suskind et al. ........ 523/201 |
| 5,910,519 A | | 6/1999 | Nuñez et al. |
| 6,545,064 B1 | * | 4/2003 | Bilodeau ................... 522/7 |
| 6,602,963 B2 | * | 8/2003 | Siol et al. ............... 525/437 |
| 6,686,431 B2 | * | 2/2004 | Barker et al. ........... 526/325 |
| 6,710,141 B1 | * | 3/2004 | Heide et al. ............. 526/88 |
| 6,881,858 B2 | * | 4/2005 | Siol ........................ 560/205 |
| 7,857,447 B2 | * | 12/2010 | Myung et al. ........ 351/159.34 |
| 2002/0071869 A1 | * | 6/2002 | Bures et al. ............. 424/487 |
| 2003/0105180 A1 | * | 6/2003 | Barker et al. ........... 526/319 |
| 2003/0220245 A1 | * | 11/2003 | Hubbell et al. .......... 514/12 |
| 2004/0186229 A1 | * | 9/2004 | Heide et al. ............. 524/832 |
| 2006/0264571 A1 | * | 11/2006 | Siol ........................ 524/916 |
| 2006/0287431 A1 | * | 12/2006 | Siol ........................ 524/556 |
| 2008/0161446 A1 | * | 7/2008 | Siol ........................ 523/201 |
| 2009/0182067 A1 | * | 7/2009 | Liu ......................... 523/106 |
| 2011/0166247 A1 | * | 7/2011 | Myung et al. .......... 523/106 |
| 2012/0145942 A1 | * | 6/2012 | Siol ........................ 252/62 |

FOREIGN PATENT DOCUMENTS

| | | |
|---|---|---|
| DE | 38 00 529 | 7/1988 |
| DE | 69314184 | 5/1998 |
| EP | 0 982 327 | 3/2000 |
| JP | 59161420 | 9/1984 |
| JP | 61-166516 | 7/1986 |
| JP | 02102213 | 4/1990 |
| WO | WO 94/12585 | 6/1994 |

OTHER PUBLICATIONS

Lewis, Richard J., Sr. (2002) Hawley's Condensed Chemical Dictionary (14th Edition), John Wiley & Sons, Online @ http://knovel.com/web/portal/browse/display?_EXT_KNOVEL_DISPLAY_bookid=704&VerticalID=0, headword = 1-thioglycerol, (Knovel Release Date: Sep 4, 2003; downloaded Sep. 20, 2011), pp. 1.*

Tsukahara et al., Journal Polym. Sci.: Part A: Polym. Chem., vol. 27, Iss. 4, pp. 1099-1114 (Mar. 10, 1989).*

Elbert et al, "Conjugate Addition Reactions Combined with Free-Radical Cross-linking for the Design of Materials for Tissue Engineering", Biomacromolecules, Jun. 2001, vol. 2, Iss. 2, pp. 430-441.*

Lin et al, "Optically Clear Simultaneous Interpenetrating polymer Networks Based on Poly(ethylene Glycol) Diacrylate and Epoxy. I. Preparation and Characterization", J. Polymer Science: Part A: Polymer Chemistry, vol. 30, pp. 1941-1951 (Aug. 1992).*

Halstenberg et al, "Biologically Engineered Protein-graft-Poly(ethylene glycol) Hydrogels: A Cell Adhesion and Plasmin-Degradable Biosynthetic Material for Tissue Repair", Biomacromolecules, Jul. 2002, 3, pp. 710-723.*

Vernon et al, "Partition-contrrolled progesterone release from waterborne, in situ-gelling materials", International Journal of Pharmaceutics 274 (Apr. 2004) pp. 191-200.*

DE 69314184, May 14, 1998, English abstract only. (Downloaded Feb. 23, 2006), online @ http://v3.espacenet.com/textdoc?DB=EPOD OC&IDX=DE69314184T&F=0.

JP 02102213, Apr. 13, 1990, English abstract only, Patent Abstracts of Japan, JPO, Tokyo, Japan.

* cited by examiner

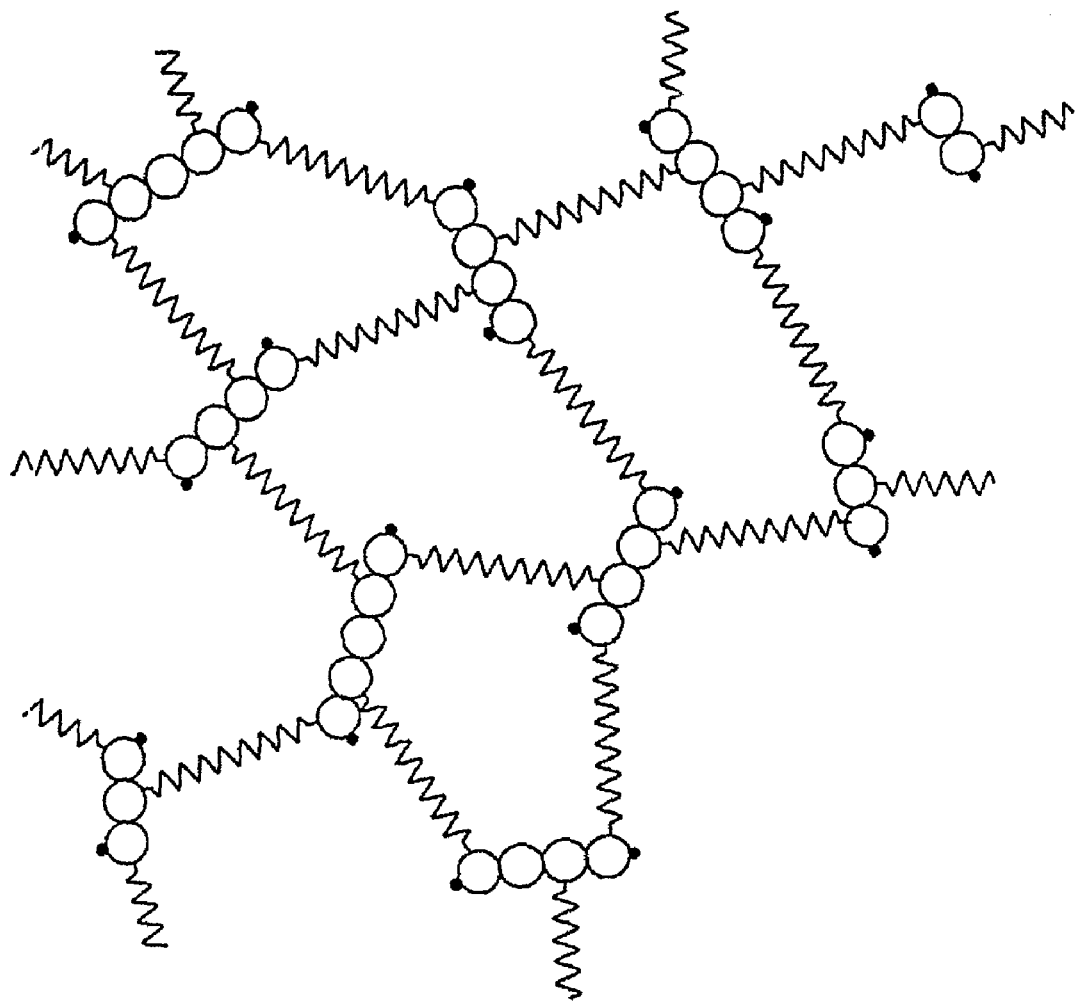
○⌇⌇⌇⌇⌇○  polyethylene glycol dimethacrylate
○  vinyl monomer B
•—•  initiator/regulator

HYDROGEL

FIELD OF THE INVENTION

The invention relates to hydrogels based on polyethylene glycol dimethacrylate and to their preparation, and to the use of these hydrogels as contact lenses, electrophoresis gels, membrane materials, and sound-deadening compositions.

PRIOR ART

Synthetic hydrogels are at present based essentially on polyacrylic acid, polymethacrylic acid, and their derivatives, such as polyacrylamide or polyhydroxyethyl methacrylate, and also on polyvinyl alcohol or polyvinylpyrrolidone. Polyethylene glycol hydrogels can be prepared, according to U.S. Pat. No. 4,684,558, by the action of high-energy radiation on an aqueous polyethylene glycol solution.

Owing to the high compatibility and low irritancy of the methacrylates, there is a tendency within the group of poly(meth)acrylates to replace acrylates by methacrylates. However, the higher stiffness of the polymethacrylate chains is a hindrance in many applications.

Thus in U.S. Pat. No. 5,397,449 an electrophoresis gel is described which is based on hydroxy esters such as glycerol monomethacrylate, for example, and on small fractions of polyethylene glycol dimethacrylate. Protein migration in this polymethacrylate network, however, is much slower than in the polyacrylamide gels used hitherto.

In the field of contact lens materials as well, problems are presented by the stiffness of the polymethacrylate chain. Thus it is known from DE 38 00 529 that hydrogel contact lenses and intraocular lenses are most compatible when they are softer than the living tissue. Although polyhydroxyethyl methacrylate can be made very soft with 60%-90% water in a swelling equilibrium, this high level of plasticizing water results in low mechanical strength. Moreover, the low refractive index of the high water content material necessitates particularly thick lenses. The longer diffusion path which this entails hinders penetration of atmospheric oxygen to the cornea.

Hydrogels having a high polyethylene glycol dimethacrylate content ought in principle to be suitable for constructing very soft hydrogels, since the polyethylene glycol chain, with a glass temperature of around $-50°$ C., is highly mobile.

At first glance, therefore, it is a mystery that polyethylene glycol dimethacrylates are used only in minor amounts in the production, for example, of hydrogels for contact lenses. For instance, JP 61166516 describes contact lenses containing up to 3% by weight of polyethylene glycol dimethacrylate.

This confinement to small amounts of polyethylene glycol dimethacrylate in the hydrogel formulas, which can be observed in numerous applications, can be explained by the polymerization behavior of the polyethylene glycol dimethacrylates. Mention may be made here, for example, of A. Reiche's postdoctural thesis "Charge transport in polymeric gel electrolytes", University of Halle (Saale) 2001 (which can also be read on the Internet at http://sundoc.bibliothek.uni-halle.de/habil-online/01/01H056/t6.pdf).
According to this the free-radical addition polymerization of oligoethylene glycol imethacrylates does not, strictly speaking, lead to homogeneous structures. In the course of the polymerization the initial species formed are microgels, which to start with are soluble in the monomer. As the polymerization progresses, these aggregates undergo crosslinking to form macrogels.

In many cases this complex polymerization profile can be mastered by adding plasticizers or solvents. Reiche, for example, adds polyethylene glycol dimethyl ether or propylene carbonate as a plasticizer.

DE 693 14 184 describes polyoxyethylene pressure-sensitive adhesives synthesized from polyethylene oxide dimethacrylate and polyethylene glycol as plasticizer.

According to JP 02102213 mixtures of polyethylene glycol dimethacrylate and ethylene glycol are mixed with ammonium persulfate and then used to seal water leaks, in tunnels for example. This material is nontoxic and exhibits excellent elasticity.

BRIEF DESCRIPTION OF THE DRAWING

The FIGURE shows a schematic view of a hydrogel.

Problem and Solution

There continues to be a need for a homogeneous, substantially plasticizer-free, optically clear hydrogel which is based on polyethylene glycol dimethacrylate and utilizes the low glass temperature of the polyethylene glycol chain (Tg: $-50°$ C.) and its high chain mobility to construct soft, elastic hydrogels. The aim here is in particular for a process which allows direct access to polyethylene glycol dimethacrylate hydrogels by simple polymerization of aqueous solutions of the polyethylene glycol dimethacrylates.

It has now been found that hydrogels having good optical and mechanical properties, based on polyethylene glycol dimethacrylate as principal constituent, can be realized if the polymerization of aqueous solutions of polyethylene glycol dimethacrylates is carried out under defined, narrow conditions and account is taken of the complex dissolution behavior of the polyethylene glycol dimethacrylates in the polar water medium.

As preliminary experiments show (see Examples), aqueous solutions of polyethylene glycol dimethacrylates exhibit the solubility behavior which is known for many nonionic surfactants.

Thus, at low temperatures, the polyethylene glycol dimethacrylates have very good solubility in water (owing to the hydration of the polyethylene glycol chain). When the temperature is increased, this hydration becomes weaker, and separation is observed. Of course, the longer the polyethylene glycol chain, the higher the separation temperature (cloud point). For instance, a 10% strength solution of polyethylene glycol dimethacrylate having an average chain length n=9 has a cloud point of 38° C. The corresponding separation temperature for polyethylene glycol dimethacrylates with n=23 is around 90° C.

Interestingly, these cloud points are lowered markedly by small additions of water-insoluble components, examples being water-insoluble regulators such as dodecanethiol. A similar effect is shown by admixtures of very short-chain polyethylene glycol dimethacrylates. Thus the cloud point of polyethylene glycol dimethacrylate with n=23 is lowered, by adding 12% of tetraethylene glycol dimethacrylate, from around 90° C. to <25° C.

This separation tendency is seen as being particularly critical in the course of polymerization. Thus the polymerization of a 10% strength solution of polyethylene glycol dimethacrylate with n=9 at 25° C., in a precipitation polymerization, leads to a white hydrogel unsuitable for optical applications (comparative example 1).

It has now been found that hydrogels having good mechanical and optical properties are obtained if mixtures of A) 80-100 parts of polyethylene glycol dimethacrylate of formula (1)

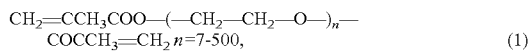

$$CH_2=CCH_3COO-(-CH_2-CH_2-O-)_n-COCCH_3=CH_2 \quad n=7\text{-}500, \quad (1)$$

B) 20-0 parts of vinyl monomers B copolymerizable with (1), and

C) 100-10 000 parts of water are polymerized with addition of free-radical initiators, the polymerization being carried out at least 15° C. below the cloud temperature of a 10% strength solution of the polyethylene glycol dimethacrylates as per (1) in water.

Particular advantages result if the polymerization is carried out at least 40° C. or, preferably, at least 60° C. below the cloud point of the 10% strength solution. The ethylene oxide content of the polyethylene glycol dimethacrylates of formula (1) is advantageously in the range n=8-200 or, preferably, between 12 and 100. Very particular preference is given to polyethylene glycol dimethacrylates whose ethylene oxide content is in the range n=16-60 or, in particular, 20-40. These figures are generally averages. A certain breadth of distribution in the chain length is entirely advantageous. It is possible, therefore, to employ polyethylene glycol dimethacrylates whose ethylene oxide content is within the range specified above, thus including corresponding commercial products, where polyethylene glycol is sometimes called polyethylene oxide and also, correspondingly, PEG or PEO. Of particular interest are the commercial products from Degussa/Röhm Methacrylates:

PEG 400 DMA=polyethylene glycol 400 dimethacrylate (n=9), PEG 600 DMA=polyethylene glycol 600 dimethacrylate (n=14), and PEG 1000 DMA=polyethylene glycol 1000 dimethacrylate (n=23), or the 60% strength solution of this product in water (Plex 6874-O)®.

It may be entirely advantageous here to mix these products, for the use of these hydrogels as sound-deadening compositions, for example. It is important that the amount of particularly short-chain polyethylene glycol dimethacrylates (n<6 or preferably n<5) is <10% or preferably <2% (based in each case on the total amount of polyethylene glycol dimethacrylate in the formula).

Particularly high-value hydrogels are obtained if the chain length of the polymethacrylate blocks is limited by addition of polymerization regulators or by a high radical flow (i.e., a high concentration of initiator or activator). This is a particularly effective measure for reducing the separation tendency in the course of polymerization.

As the skilled worker is aware, free radicals can be generated by thermal, redox or photochemical methods or by exposure to high-energy radiation. Suitable thermal initiators include azo compounds, peroxides, and persulfates. If peroxides and persulfates are employed in combination with a reducing agent such as ascorbic acid or a bisulfite compound and, if desired, a transition metal salt such as iron, the redox generation of free radicals may even take place at room temperature.

A free-radical initiator system of particular interest is ammonium peroxodisulfate/N,N,N,N-tetramethyl-ethylene-diamine (APS/TEMED).

In general the initiator is employed in an amount corresponding to 0.1%-10% by weight, based on the amount of polyethylene glycol dimethacrylate used. Where no polymerization regulators are employed, the rule is that the molar ratio of polyethylene glycol dimethacrylate to initiator is <200 to 1, preferably <50 to 1.

The use of polymerization regulators deserves particular attention. Chain transfer regulators of this kind include compounds having a mobile hydrogen atom, cumene for example; additionally, halogen-containing compounds can be employed, however. Preference is given to sulfur-containing polymerization regulators, especially mercaptans; water-soluble mercaptans are particularly preferred. Examples here include derivatives of thioglycolic acid, or of thiolactic acid. Generally speaking, mercaptans having only one SH group are employed, such as mercaptoethanol, 1-mercapto-2-propanol, and 3-mercapto-1,2-propanediol, although in principle the use of polyfunctional mercaptans is also possible, dithio-erythritol, for example. Examples of mercaptans include water-soluble, hydroxyl-containing mercaptans. The regulators are used preferably in fractions of 0-30 mol %, based on the polyethylene glycol dimethacrylates employed. Despite this amount of regulator, which is high in some cases, the hydrogels thus prepared are, as a general rule, entirely odorless. In certain circumstances the reason for this lies in the fact that, within this complex network, at least toward the end of the polymerization, the chain regulators are the most mobile component of the polymerization mixture and hence are incorporated fully into the network.

The use of mercaptans allows the length of the methacrylate chains to be controlled decidedly well. Thus it has been found that in the case of short-chain polyethylene glycol dimethacrylates (i.e., small n as per formula (1)), in particular, a high level of regulator is needed in order to obtain a transparent, elastic hydrogel, whereas in the case of longer-chain polyethylene glycol dimethacrylates (i.e., large n as per formula (1)) the amount of regulator can be lower.

The rule is that the molar ratio of polyethylene glycol dimethacrylate to mercaptan ought to be not more than the number of ethylene oxide groups in the polyethylene glycol dimethacrylate, i.e., n. Particularly advantageous hydrogels are obtained when the molar polyethylene glycol dimethacrylate/mercaptan ratio is <0.5n, and in general the molar polyethylene glycol dimethacrylate/sulfur atoms ratio is then also <0.5n.

As a result of the abovementioned high free-radical flow and/or amount of regulators, hydrogels are realized of the kind depicted schematically in the FIGURE. The polymerized methacrylate chain is advantageously so short that these methacrylate oligomers do not form a separate phase. Hence the elasticity and mobility of the hydrogel according to the FIGURE is determined substantially by the length of the polyethylene glycol blocks. Since mercaptans have a transfer constant for methacrylic esters of generally 1 or somewhat lower than 1 (e.g., 0.6-0.9 for the 3-mercapto-1,2-propanediol/MMA system), the amount of mercaptan used in relation to the amount of polyethylene glycol dimethacrylate used allows the length of the polymethacrylate blocks to be estimated decidedly well.

The FIGURE also shows that the water content of the hydrogels is dependent on the chain length of the polyethylene glycol blocks. Assuming, for hydrogels with n=10, a ratio of polyethylene glycol dimethacrylate to water of 1/1 to a maximum of 1/5, then chains with n=20, even, allow a much higher water content, e.g., 1/2 to approximately 1/20, while chains with n=100 permit an even higher water content. The general rule is that the weight water/polyethylene glycol dimethacrylate ratio ought to be <n, preferably <0.5n.

The amount of monomers of type B is generally restricted to 0-20 parts by weight per 100 parts by weight of polyethylene glycol dimethacrylate. Compounds suitable primarily as monomers B are amides and/or esters of methacrylic acid having 1-18 carbon atoms: methyl methacrylate or glycerol monomethacrylate, for example. Particular interest as monomers B is possessed by methacrylic esters $CH_2=CCH_3CO-$ O—(—CH$_2$—CH$_2$—O—)$_n$—H, where n=7-500 and in general corresponds to the n of the polyethylene glycol dimethacrylate employed. Mention may additionally be made of polymerizable stabilizers or methacrylic acid derivatives with reactive groups, such as glycidyl methacrylate, or monomers with aryl groups, which allow the hydrogel's refractive index to be raised.

When they have been fixed by polymerization, the resulting hydrogels have excellent mechanical and optical properties, such as good elasticity, excellent clarity (haze <30%, preferably <10% to ASTM 1003), a light transmittance >90% (DIN 5306), and low coloration (yellow value <500, preferably <200, and very preferably <100 APHA).

These hydrogels can also be heated without problems beyond the original separation temperatures (cloud points) without loss of the good optical and mechanical properties.

The invention accordingly also provides hydrogels containing in polymerized form
A) 80-100 parts of polyethylene glycol dimethacrylate of formula (1)

$$CH_2=CCH_3COO-(-CH_2-CH_2-O-)_n-COCCH_3=CH_2 \; n=7\text{-}500, \quad (1)$$

B) 20-0 parts of vinyl compounds B copolymerizable with (1), and
C) 100-10 000 parts of water,
characterized in that these hydrogels have a haze to ASTM 1003 <30%.

Of particular interest are hydrogels having a light transmittance >90%.

The invention in particular provides hydrogels having a weight ratio of water to polyethylene glycol dimethacrylate in the range from 1:1 to 1:0.5n.

Preferred hydrogels are those which contain sulfur atoms and in which the molar polyethylene glycol dimethacrylate/sulfur ratio is <0.5n.

Particular advantages result when the fraction of polyethylene glycols of the type HO—(—CH$_2$—CH$_2$—O—)$_n$—H n=1-100 is <5% by weight, preferably <2% by weight.

PARTICULAR EFFECTS OF THE INVENTION

On the basis of the excellent mechanical and optical properties of the hydrogels of the invention there are a range of industrial applications.

For instance, these hydrogels are suitable contact lens material, allowing very soft lenses, in particular, to be produced. The refractive index can be adjusted via the water content or via the accompanying use of monomers B with an increased refractive index. The possibility of coloring exists, additionally.

Mention should also be made of electrophoresis gels. Here, the high mobility of the polyethylene glycol chain and the possibility of virtually arbitrary architecture of the network density via the length of the polyethylene glycol blocks or the water content are deserving of mention. Thus for the analysis of small molecules preference will be given to selecting networks having a high solids content, and low values for n, whereas more wide-meshed networks will be preferred for separating large molecules.

Furthermore, applications result as membranes or membrane constituents, dialysis membranes for example.

The high mobility of the hydrogels of the invention, the great possibility for variation of the network density, and the high possible water content also allow these hydrogels to be employed as insulating materials, such as sound-deadening compounds, for example.

For all of these applications it is an advantage that, owing to the low toxicity of the polyethylene glycol dimethacrylates, the hydrogels can be synthesized directly at the premises of the user, by pouring of the aqueous solutions into a corresponding mold, for example.

Depending on the application, the hydrogel, after the polymerization process, can be removed from the mold or else can remain directly in the mold, as in the case of large surface-area sound-deadening applications, for example—it can remain between two sheets of glass, for example.

Specifically, for the production of contact lenses or electrophoresis gels it is advantageous that the aqueous solutions of the polyethylene glycol dimethacrylates are oligomeric formulas, with the polymerizable fraction, i.e., essentially the methacrylic group, being relatively low.

For example, a formula with 10% polyethylene glycol 1000 dimethacrylate (n=23 in formula (1)) contains only 0.17 mol of methacrylate units/kg of mixture. Hence even under adiabatic conditions the heating calculated as a result of the polymerization operation is only 2.5° C. In the case of a 10% acrylamide formula, this polymerization-induced heating is approximately 10 times as great.

The situation as regards polymerization shrinkage is similar. This shrinkage is very low, owing to the low concentration of the methacrylate units. Both factors—low heat of polymerization and low contraction on polymerization—permit effective modeling of the hydrogels in the casting molds.

As a general rule, use will be made as far as possible of polyethylene glycol dimethacrylates with low levels of stabilization. The fraction of polymerization inhibitor, hydroquinone monomethyl ether for example, ought generally to be <400 ppm or preferably 200 ppm, based on the polyethylene glycol dimethacrylate employed, or <100 ppm or preferably <20 ppm based on the overall formula.

As a general rule it is advisable to degas the polymerization mixture prior to casting and to polymerize it directly or under inert gas (e.g., nitrogen). In many cases, however, degassing or operation under inert gases is not necessary at all. Following the polymerization operation proper, which is conducted preferably at very low temperatures under redox conditions, the hydrogel, to complete the polymerization, is heat treated or left in the mold at room temperature for a few minutes up to, for example, 24 hours.

EXAMPLES

The examples which follow are intended to illustrate the invention, but should not be understood as a restriction.
Preliminary Tests The following preliminary tests illustrate the complex dissolution behavior of the polyethylene glycol dimethacrylates in water. For the tests, 1 g of polyethylene glycol dimethacrylate or corresponding polyethylene glycol dimethacrylate mixtures is dissolved in 9 g of water, or mixed with 9 g of water, and the solution or mixture is heated to the separation temperature (cloud point).

| Composition of the polyethylene glycol dimethacrylates 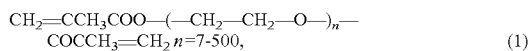 | | | |
|---|---|---|---|
| n = 4 | n = 9 | n = 23 | Cloud point |
| — | 100% | — | 38° C. |
| — | — | 100% | about 90° C. |
| 12% | — | 88% | <25° C. |
| — | 33% | 67% | 65° C. |

In the following examples the ammonium peroxodisulfate initiator is used as a 10% strength solution in water. The data in the examples relates to the solid employed. The data on the polyethylene glycol dimethacrylate (DMA)/water ratio are weight data; the data relating to the polyethylene glycol dimethacrylate (DMA)/regulator ratio are molar data.

The haze (clouding) is reported in % (ASTM 1003).

The light transmittance is determined in accordance with DIN 5036.

The APHA yellow value is determined in accordance with DIN 53409.

Comparative Example

Not Inventive

Water/DMA=6.0 DMA/Regulator=7.2 0.5n Limit: 4.5 Polymerization Close to the Cloud Point A solution of 1.4 g of polyethylene glycol dimethacrylate (n=9) (2.5 mmol) (PEG 400 DMA from Degussa/Röhm Methacrylates), 0.022 g of ammonium peroxodisulfate and 0.038 g of 3-mercapto-1,2-propanediol (0.35 mmol) in 8.5 g of water is admixed with 0.022 g of N,N,N,N-tetramethylethylenediamine, poured into a glass mold and degassed (vacuum approximately 30 mbar). The batch polymerizes directly after degassing at a temperature of about 25-30° C. This produces a snow-white, elastic hydrogel which is unsuitable for optical applications.

Example 1

Water/DMA=8.7 DMA/Regulator=3.0 0.5n Limit: 11.5 Polymerization about 85° C. Below the Cloud Point A mixture of 1.760 g of Plex 6874-O® from Degussa/Röhm Methacrylates (60% strength solution of PEG 1000 DMA in water)(=1.056 g of polyethylene glycol dimethacrylate (n=23) (0.9 mmol) in 0.704 g of water), 0.021 g of ammonium peroxodisulfate and 0.033 g of 3-mercapto-1,2-propanediol (0.3 mmol) is admixed at about 5° C. with 0.028 g of N,N,N,N-tetramethylethylenediamine, degassed and polymerized under argon at 5° C. Demolding gives a crystal-clear, bright, elastic hydrogel (light transmittance >90%, haze <10%) suitable for optical applications and as an electrophoresis gel.

Example 2

Water/DMA=3.9 DMA/Regulator=1.9 0.5n Limit: 12.5 Polymerization about 80° C. Below the Cloud Point A solution of 2.0 g of polyethylene glycol dimethacrylate (n about 25) (1.6 mmol), 0.026 g of ammonium peroxodisulfate and 0.091 g of 3-mercapto-1,2-propanediol (0.84 mmol) in 7.825 g of water is mixed at about 5° C. with 0.022 g of N,N,N,N-tetramethylethylenediamine and the mixture is degassed and polymerized at 5-10° C. under argon as inert gas. This produces a colorless, crystal-clear hydrogel which exhibits good strength and elasticity. This hydrogel has good cutability and is suitable as an electrophoresis gel and for optical applications. It has a light transmittance >90% and haze <10%.

Example 3

Water/DMA=4.6 0.5n Limit: 11.5 Polymerization with a Redox System about 70° C. Below the Cloud Point A mixture of 3.0 g of Plex 6874-O® from Degussa/Röhm Methacrylates (60% strength solution of PEG 1000 DMA in water)(=1.8 g of polyethylene glycol dimethacrylate (n=23) (1.54 mmol) in 1.2 g of water), 3.0 g of a 1% strength solution of potassium peroxodisulfate in water, 1.0 g of a 1% strength solution of sodium hydrogensulfite in water and 3.0 g of water is admixed with 40 µl of a solution of 100 ppm of iron (II) sulfate in water and 20 µl of 1 N sulfuric acid and the mixture is degassed and polymerized under argon at about 20° C. Polymerization commences immediately after degassing. This produces a clear, stable hydrogel.

Example 4

Water/DMA=3.4 DMA/Regulator=3.7 0.5n Limit: 4.5 Polymerization about 20° C. Below the Cloud Point 2.261 g of polyethylene glycol dimethacrylate (n=9) (4.11 mmol)(=PEG 400 DMA from Degussa/Röhm Methacrylates), 0.021 g of ammonium peroxodisulfate, 0.121 g of 3-mercapto-1,2-propanediol (1.12 mmol) and 7.887 g of water are mixed with ice-water, with cooling, and the mixture is degassed, blanketed with argon and polymerized at 15-20° C. This produces an almost clear hydrogel having a pale blue tinge (Tyndall) and good mechanical properties (elastic, bendable).

The invention claimed is:

1. A hydrogel, comprising:
   in polymerized form
   A) 80-100 parts by weight of polyethylene glycol dimethacrylate of the formula (1)

$$CH_2=CCH_3COO-(-CH_2-CH_2-O-)_n-COCCH_3=CH_2 \ n=7\text{-}500, \quad (1)$$

B) 20-0 parts by weight of a vinyl compound B copolymerizable with (1), and
   C) 100-10 000 parts by weight of water,
   wherein said hydrogel comprises sulfur and a molar polyethylene glycol dimethacrylate/sulfur atoms ratio is <0.5n;
   wherein said hydrogel comprises an initiator comprising peroxodisulfate; and
   wherein the polymerization is carried out in the presence of a mercaptan selected from the group consisting of mercaptoethanol, 1-mercapto-2-propanol, and 3-mercapto-1,2-propanediol, and
   wherein the molar polyethylene glycol dimethacrylate/mercaptan ratio is <0.5n;
   wherein said hydrogel exhibits a haze of <10%, a light transmittance of >90% and a yellow value of <200.

2. The hydrogel of claim 1, which has a weight water/polyethylene glycol dimethacrylate ratio in the range 1/1 to 0.5n/1.

3. The hydrogel of claim 1, wherein compound B is present and is an amide of methacrylic acid, an ester of methacrylic acid having 1-18 carbon atoms or mixtures thereof.

4. The hydrogel of claim 1, wherein compound B is present and is methyl methacrylate or glycerol monomethacrylate.

5. The hydrogel of claim 1, wherein compound B is present and is a methacrylic ester $CH_2=CCH_3CO-O-(-CH_2-$ $CH_2-O-)_n-H$, wherein n=7-500 and corresponds to the n of the polyethylene glycol dimethacrylate.

6. The hydrogel of claim 1, wherein compound B is present and is a glycidyl methacrylate.

7. A contact lens material, comprising: the hydrogel of claim 1.

8. An electrophoresis gel, comprising: the hydrogel of claim 1.

9. A membrane material, comprising: the hydrogel of claim 1.

10. A sound-deadening compound, comprising: the hydrogel of claim 1.

11. The process for preparing a hydrogel of claim 1, said process comprising:
polymerizing a mixture of
(A) 80-100 parts by weight of polyethylene glycol dimethacrylate of the formula (1)

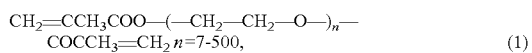
$$CH_2=CCH_3COO-(-CH_2-CH_2-O-)_n-COCCH_3=CH_2 \; n=7\text{-}500, \quad (1)$$

(B) 20-0 parts by weight of vinyl compounds B copolymerizable with the compound of (1), and
(C) 100-10 000 parts by weight of water in the presence of a free-radical initiator,
the polymerization being carried out at least 15° C. below a cloud point of a 10% strength solution of the polyethylene glycol dimethacrylates of formula (I) in water;
wherein the polymerization is carried out in the presence of a mercaptan, and
wherein the molar polyethylene glycol dimethacrylate/mercaptan ratio is <0.5n.

12. The process of claim 11, wherein the molar polyethylene glycol dimethacrylate/initiator ratio is <200/1.

13. The process of claim 11, wherein said mercaptan is a water-soluble, hydroxyl-containing mercaptan.

14. A process for preparing a hydrogel, said process comprising:
polymerizing a mixture of
(A) 80-100 parts by weight of polyethylene glycol dimethacrylate of the formula (1)

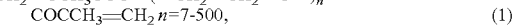
$$CH_2=CCH_3COO-(-CH_2-CH_2-O-)_n-COCCH_3=CH_2 \; n=7\text{-}500, \quad (1)$$

(B) 20-0 parts by weight of vinyl compounds B copolymerizable with the compound of (1), and
(C) 100-10 000 parts by weight of water
in the presence of an initiator comprising peroxodisulfate,
the polymerization being carried out at least 15° C. below a cloud point of a 10% strength solution of the polyethylene glycol dimethacrylates of formula (I) in water,
wherein the polymerization is carried out in the presence of a mercaptan selected from the group consisting of mercaptoethanol, 1-mercapto-2-propanol, and 3-mercapto-1,2-propanediol, and
wherein the molar polyethylene glycol dimethacrylate/mercaptan ratio is <0.5n,
wherein said hydrogel comprises in polymerized form
A) 80-100 parts by weight of polyethylene glycol dimethacrylate of the formula (1)

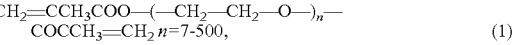
$$CH_2=CCH_3COO-(-CH_2-CH_2-O-)_n-COCCH_3=CH_2 \; n=7\text{-}500, \quad (1)$$

B) 20-0 parts by weight of a vinyl compound B copolymerizable with (1), and
C) 100-10 000 parts by weight of water,
wherein said hydrogel comprises sulfur and a molar polyethylene glycol dimethacrylate/sulfur atoms ratio is <0.5n;
wherein the molar polyethylene glycol dimethacrylate/mercaptan ratio is <0.5n;
wherein said hydrogel comprises an initiator comprising peroxodisulfate; and
wherein said hydrogel exhibits a haze of <10%, a light transmittance of >90% and a yellow value of <200.

* * * * *